(12) United States Patent
Mullikin

(10) Patent No.: US 10,786,742 B1
(45) Date of Patent: Sep. 29, 2020

(54) BROADCAST SYNCHRONIZED INTERACTIVE SYSTEM

(71) Applicant: John D Mullikin, Austin, TX (US)

(72) Inventor: John David Mullikin, Austin, TX (US)

( * ) Notice: Subject to any disclaimer, the term of this patent is extended or adjusted under 35 U.S.C. 154(b) by 84 days.

(21) Appl. No.: 15/957,856

(22) Filed: Apr. 19, 2018

Related U.S. Application Data

(60) Provisional application No. 62/487,378, filed on Apr. 19, 2017.

(51) Int. Cl.
| | |
|---|---|
| A63F 13/00 | (2014.01) |
| A63F 13/812 | (2014.01) |
| H04H 20/08 | (2008.01) |
| H04N 21/472 | (2011.01) |

(52) U.S. Cl.
CPC ........... *A63F 13/812* (2014.09); *H04H 20/08* (2013.01); *H04N 21/47205* (2013.01); *A63F 2300/8011* (2013.01)

(58) Field of Classification Search
None
See application file for complete search history.

(56) References Cited

U.S. PATENT DOCUMENTS

| | | | | |
|---|---|---|---|---|
| 7,211,000 | B2 * | 5/2007 | Jutzi ....................... | A63F 13/12 463/40 |
| 8,932,136 | B2 * | 1/2015 | Lemmons ............... | A63F 3/081 348/14.03 |
| 10,412,442 | B1 * | 9/2019 | Evans ................. | H04N 21/8173 |
| 10,506,287 | B2 * | 12/2019 | Hattery ................. | G06Q 50/01 |
| 2002/0119823 | A1 * | 8/2002 | Beuscher ............... | A63F 13/12 463/42 |
| 2010/0281108 | A1 * | 11/2010 | Cohen .................. | H04N 21/235 709/203 |
| 2012/0244949 | A1 * | 9/2012 | Redling .............. | H04L 65/1083 463/42 |
| 2015/0026728 | A1 * | 1/2015 | Carter ................ | H04N 21/6581 725/42 |

* cited by examiner

*Primary Examiner* — Sunit Pandya

(57) ABSTRACT

A method and system for physically interacting with a live broadcast stream is described. For example, in one embodiment, the users swipe or swing a mobile phone device to virtually swing and hit at a live pitch on a standard TV broadcast. The invention can also be used while present at the event.

15 Claims, 5 Drawing Sheets

BROADCAST SYNCHRONIZED INTERACTIVE SYSTEM

FIELD OF THE INVENTION

The present invention generally relates to interactive computer gaming, and more particularly to a method and system for an interactive baseball game.

BACKGROUND OF THE INVENTION

Currently, computer games are generally played with one player locally or with multiple players being internet connected and viewing the digitally rendered synchronized common playing domain through the view portal controlled by the individual player. Computer games have so far not incorporated a live sporting event or other live real-time event whereby the players physically interact with the live action while scoring and competing against one another. Viewers of a live broadcast sometimes become distracted and disengaged when the live action is slower and there is an opportunity to gamify the program, thus improving viewership ratings and revenue.

Various tracking technologies exist to measure the 3D position in time of a sporting object such a baseball, soccer ball golf ball, etc. and to display track results graphically overlaid on the live broadcast. For example, displaying the baseball pitch placement within the batter's box or the graphic trail of a golf ball or hockey puck can improve the viewer experience. The real-time or near real-time track data has not been used in conjunction with a fan's sporting action for fan-to-fan competition.

Heretofore there has not been a device/system/process that allows a user to play a competitive computer video game or otherwise interact in real-time with the live action of a broadcast stream. The current invention overcomes these limitations by means of a novel and useful system and method. The invention utilizes measurements from the live event correlated to the user actions input to a computer system running an application that receives and compares the measured field data to the user input data while factoring in the broadcast delay. For instance, this allows a user to virtually swing at a pitch or virtually block a goal for a game that is being viewed on a standard TV broadcast.

SUMMARY

A broadcast synchronized interactive computer application, system and method that allows a user to physically interact and react via computer input device to the events of the live or streaming broadcast is described. In one embodiment, a gamification of a live broadcast enables competition between users who may be viewing at the same stadium or ballpark, viewing the same broadcast screen in a pub, or in remote locations viewing separate broadcast screens. In one embodiment, the application employs a method of time synchronizing the computer application with a live video broadcast by employing the video camera connected to the computer on which the said interactive computer application is running and using said video camera and audio stream to sense the broadcast, determine which live event is being viewed and determine the broadcast latency for the purpose of measuring the user interactive timing relative to the viewed with a latent live event timing. Various methods exist for finding one stream segment within a stored segment or set of segments. Once the corresponding audio and/or video elements are found in each stream, the time of that frame/element of the live broadcast is compared to the internal time of the computer to establish the a time differential which remains constant given that the broadcast system latency remains constant.

In one example, a live event such as a major-league baseball game is watched by a player holding a mobile phone with a gamification application running on the device. To use the system, when a pitch is delivered by the broadcast pitcher (whether live, latent re-broadcast or otherwise streamed) and viewed by the player, the player interacts by choosing to "swing" at the pitch or not. The player attempts to swing at the right time, position and velocity by preferably swiping the screen input of the device across the designated swipe area as the televised live pitch crosses batting area. If playing on other devices, the player can use the invention by dragging a mouse "swipe", or any other physical motion that is sensed and input to the system. By measuring the player motion and timing relative to the viewed pitch or other measured event timing, the player's "swing" is compared to the measurements of the live event and scored or rated for gaming or other useful purposes such as training. In the baseball related embodiment, the on-field pitch timing across the plate and user "swipe" timing across the virtual graphic plate are compared along a continuous scale and rated as late, on time or early, for example. By measuring the trajectory of the swipe within the designated swipe area relative to the trajectory of the live baseball tracked within the real strike-zone, together with the previously described swing timing, a simulation algorithm is used to predict a hit or miss; and if hit, the virtual ball placement and likelihood of a ground ball out, pop fly, home run etc. for the swipe/swing. If the real pitch is called strike in the live game and the player did not swipe, a strike is called against the player. The designated comparison result between the live pitch and the player's swipe can used for example in a game to advance runners and score points, to simply to track a player's proficiency, to compete directly against another player, or to augment the scoring of a competition such as fantasy baseball. The comparison and evaluation of the live pitch to the user input can use tolerance parameters that enable less skilled users to score a virtual hit when position and timing are to some degree of close to that which would otherwise be required of the most skilled users. These tolerance parameters can be determined through user selection of through a handicapping system based on past performance.

In another example, the invention applies to a soccer match and incorporates 3D time stamped position tracking measurements of the soccer ball on the live field. For viewers watching the match on TV or other stream, whether at the stadium or remotely, can use the invention to play and compete by attempting to block shots on goal. In this scenario, the user input may be a tap on a touch screen display the screen in an area that simulates the area of the goal net. When the user perceives that a shot is approaching the goal on the broadcast match, the user taps the screen in the correct position and the correct time to virtually block the shot. Various scoring, gamification scenarios, and tolerance parameters can be employed analogous to the baseball example. Various measurement comparison threshold parameters are used to determine whether the blocking attempt was successful, these parameters depending on the players handicap based on past performance or the level of difficulty selected by the user. The method and system of mapping the field measurement to the user and registering the events by measuring the field time relative to the broadcast time applies to both examples.

Other embodiments employ other computer types and input devices such as common desktop computer with mouse or touchpad input for the swipe/swing or the accelerometer input of a mobile phone while the player physically swings the mobile device like a bat or with the motion of a basketball shot. Other embodiments incorporate measurements from various live events such as a live broadcast tennis match, basketball game, boxing match, cricket match, or a broadcast devised and specifically designed to use the invention employing real-time physical reaction input from remote viewers playing the game against others.

The invention is not limited to sporting events or events broadcast over television. For example, police training might incorporate reaction and evaluation of a trainee or set of trainee's response to an instructor or actor's action that is streamed to the trainees. More generally, the invention comprises measuring motion of real-world objects or events, recording video of the motion or graphically representing the event motion, displaying the recorded or generated video to a user or the user viewing the event live, correlating the display to timing to the actual event timing, then mapping, comparing and evaluating the real-world temporal and spatial measurements to the user's input as a physical reaction to the displayed or live event.

The broadcast event can also be displayed or streamed on the gaming computer device, with overlaid graphics to enable the game application. Other embodiments include other user input types. Other embodiments may include those in which the interaction is not specifically intended for gaming. For example, a training system might be devised where users are compared and rated against one another.

A system may also incorporate the transmission of a live stream broadcast to a single user or to multiple users, where the live stream can be generated from the motions of another player and as the result of graphics generation. For example, one player might control a virtual pitcher with a throwing motion and the pitch might be "hit" by multiple players viewing the virtual graphic pitch through systems of varying transmission latency. The pitch or other action may also come from a data store or library of actions that have been measured and time stamped with video of the motion for on later replay presentation to the user.

The claimed broadcast synchronized system and method overcomes the inability of previously known interactive games and applications to include a live broadcast watched by multiple players as a basis for physically competing against one another. The invention incorporates a useful non-obvious method, process, and system by which temporal physical input from users can be used to synchronously interact in response to broadcast stream such a sporting event input that has not previously been described in the art.

DETAILED DESCRIPTION OF THE DRAWINGS

Figure 1:
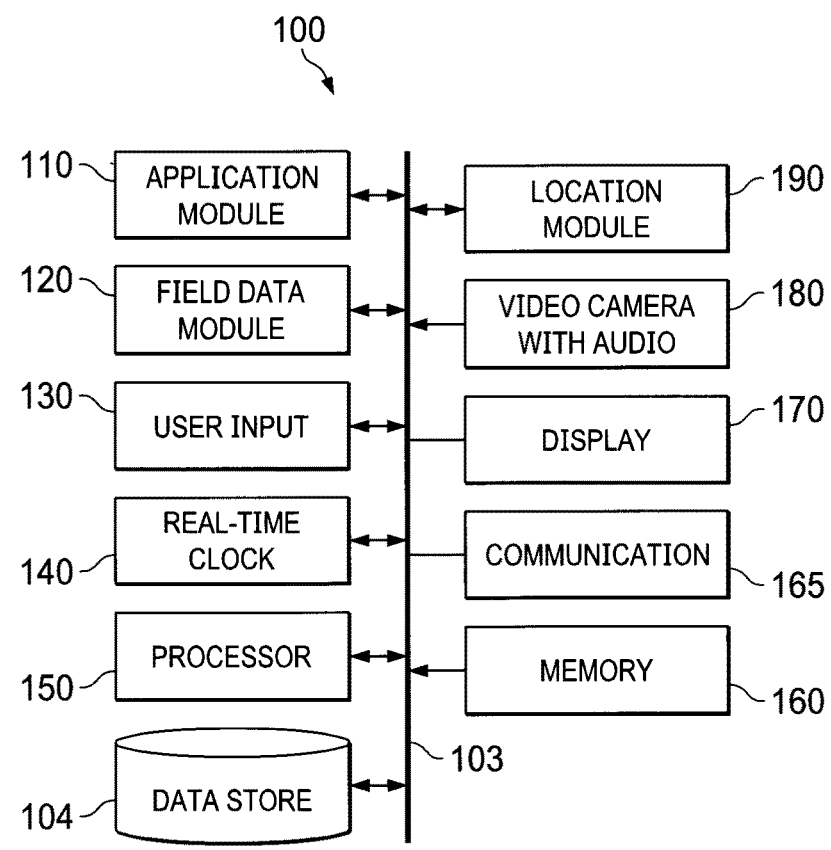
FIG. 1 is a block diagram of an example synchronized interactive system

Referring now to FIG. 1, an example synchronized interactive system 100 is comprises modules integrated together through a data bus 103. In this example, the application module 110 and other modules utilize a processor 150 with memory 160 and data store 104 to accomplish the execution of process steps; and a display module 170 can be configured to provide graphic elements facilitating user input and facilitating other inputs received from the user.

The field data input module 120 can be configured to receive measured data from a live action event such as series of position measurements defining a baseball track, typically including a time stamp with each measurement. The live event measurements can also be obtained from an input device manipulated by a player participant, such as a moving acquiring data from a virtual reality "VR" wand or other instrumented device.

The user input module 130 can be configured to receive input from the user. For example, a touch sensitive screen can be used to acquire a series of finger position measurements defining the track of a swipe or tap, with time stamps included in the stream of data or time data acquired from the real-time clock module 140. The time stamped input data from input module 130 can then be used by application module 110 to determine user input metrics such as swipe speed, vertical position and time that the user swipe crossed a displayed graphic element on a touch screen or other user input metrics that can be used to compare the user input action to a live or simulated live event measurement. User input might also be received by module 165 from an instrumented sporting device such as a bat containing motion sensors and accelerometers connected via wireless communication such as Bluetooth.

Application module 110 can be configured to perform much of interactive capabilities of the system including for example user identification, calibration, mode selection and gamification including for example selecting the type of game or training exercise to be played and pitting players or groups against one another, including selecting or inviting potential players based on the users social contacts or proximity of other users utilizing input from the location module 190 to identify users which may be nearby or in the same sports pub for example. The location module 190 can also for example be configured to utilize GPS signals to determine if the user is in the stadium where the live action is taking place or to pit the users against other users in the stadium.

The application module 110 can also be configured to control the overall flow of data and to control the flow of the interaction between users and to communicate point or rating status to other users, including a leader board, for example, displayed at the stadium or sports pub. The application module 110 can also be configured to prompt users for inputs and allow selection modes and process via displayed user menus. The application module can also be configured to perform time calibration by measuring broadcast delay, if any, as will later be discussed.

The video input module 180 can be configured to receive a video and audio stream which the application module 110 can measure in the time calibration process to be discussed later. For example, module 180 can receive a video signal from a camera which is integrated within a mobile device on which the application 110 resides. This camera can be used to capture video of a TV or monitor which is displaying a broadcast for which field measurements are being collected and received by the field data input module 120 and used in determining the broadcast delay of the TV or monitor display.

The communications module 165 can be configured to receive data over WiFi from the internet, for example, or Bluetooth from nearby devices, and such data can to be transferred to other modules, such as the field measurement input module. For example, the field time at which a baseball crossed the plate at a given position in the strike zone can be then transmitted via internet and made available to the application module. The communications module 165 can also be configured to allow multiple users to communicate text, video, voice audio etc. via Wi-Fi, Bluetooth, or other protocol.

Figure 2:
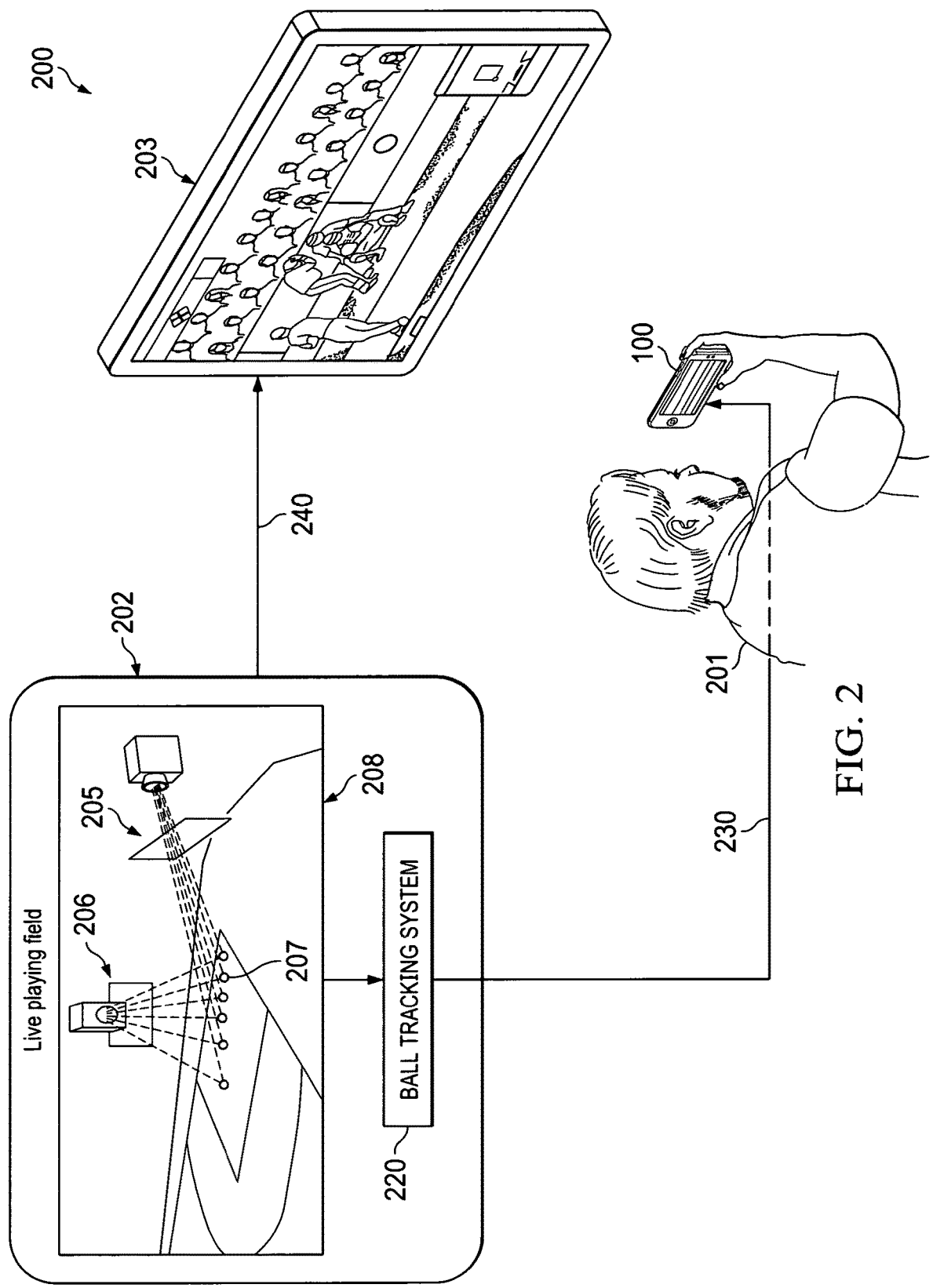
FIG. 2 is an overview of one embodiment of the invention applied to a baseball sporting event.

Referring now to FIG. 2, an example of using the system for virtual interaction with a live event or latent-live event is illustrated. System 200 can comprise a live action component, for example a baseball sporting competition 208 where measurements of the live action are made utilizing instruments such as cameras 205 or radars 206, and a tracking system 220 that can be configured to report time-stamped measurements such as a ball track position sequence, and communicate this data to system 200 over the internet for example. Other measured data such as strike zone and plate position may also be communicated via the ball tracking system or otherwise communicated to the via user input to system 200.

To use system 100 configured with tracking system 220 and display 203, user 201 views the live event either directly or via a live-latent broadcast shown on display 203. The latency of the broadcast is assumed constant and this latency is either known, or can be measured, as will be later described. While viewing the event directly or on display 203, user 201 interacts with the live event through input to processing system 100, such input for example comprising swinging a device which may contain accelerometers and motion sensors received by input module 130 or swiping across the touch sensitive screen of the integrated mobile device encompassing system 100. The input metrics are computed and compared to the time correlated field metrics and the result of the comparison is used for scoring, training or other purposes.

Note that in another embodiment, tracking system 220 can replaced with a graphics extraction system that measures ball position within the strike zone by recognizing and analyzing the graphics overlay generated by a broadcast network. In this case, the network may use a tracking system such as 220 to position the overlay graphics within the video frame dimensions. The position of the pitch relative to the strike zone can then be extracted from the video and communicated to system 100 by using standard image processing techniques to determine the pixel position of a graphic representing the ball and strike zone. The techniques may exploit consistent characteristics of the graphics overlay such as color, shape, size, etc. and may be configured to exploit consistent timing of the appearance of the graphic relative to the timing of the video frame of the pitch over the plate in order to evaluate the user input timing relative to the optimal timing for a virtual hit. This video extraction technique for obtaining field metrics of the live action may be applied to other broadcast scenarios.

Figure 3A:
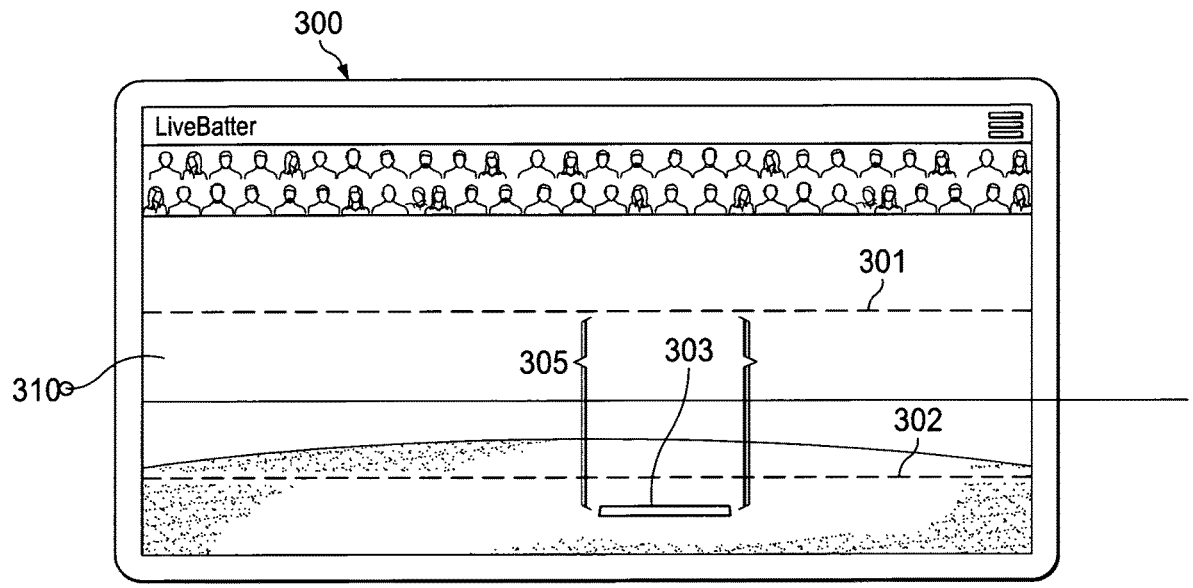
FIG. 3A illustrates the strike zone in one embodiment of the user screens and input for an example mobile gaming application.
Figure 3B:
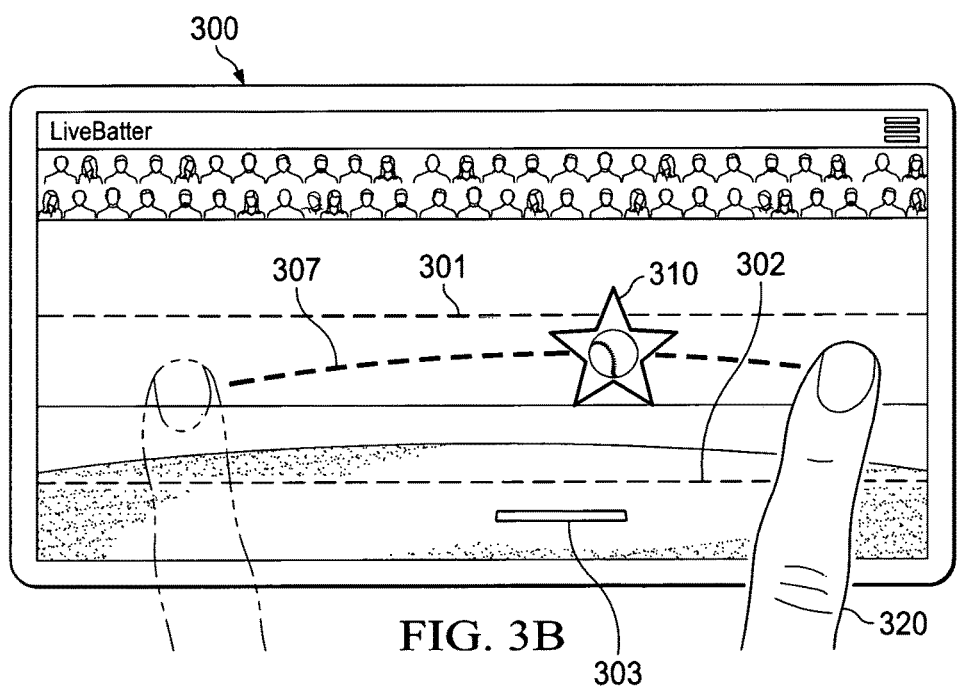
FIG. 3B illustrates a swipe simulating a swing and hit in one embodiment of the user screens and input for an example mobile gaming application.
Figure 3C:
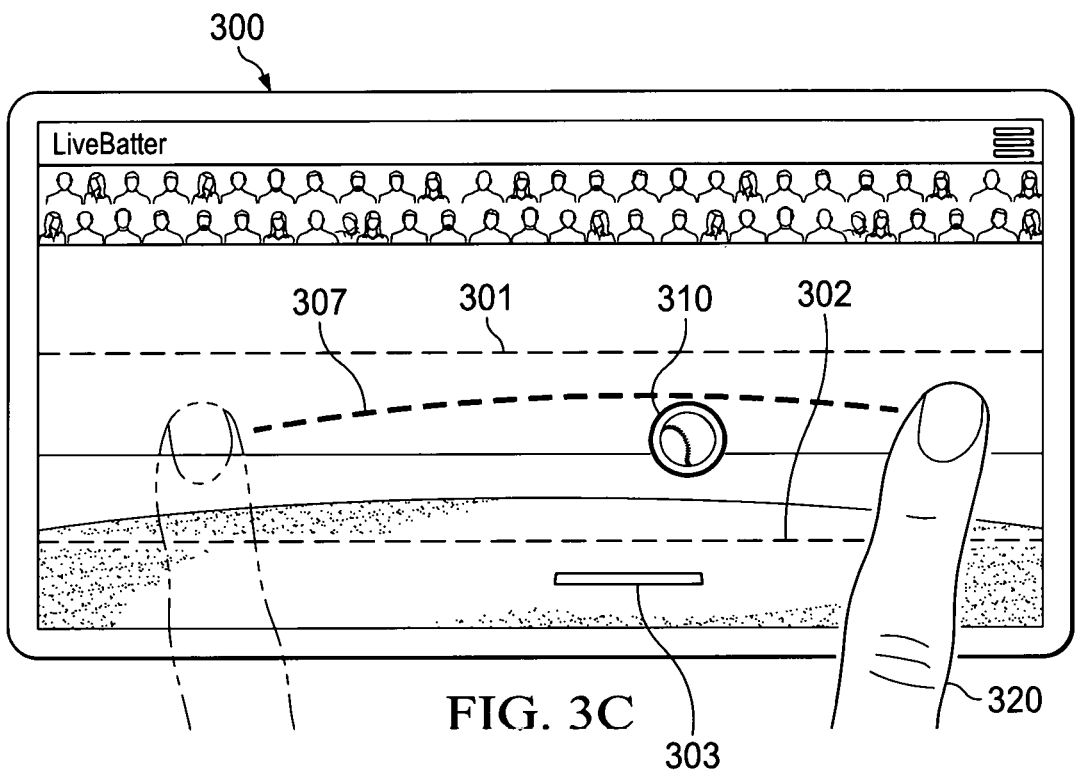
FIG. 3C illustrates a swipe simulating swing and miss in one embodiment of the user screens and input for an example mobile gaming application.

In one embodiment of the system in which the live action is from a baseball sporting event, an example of the comparison of user input metrics to live action metrics is illustrated in FIG. 3A and FIG. 3B. FIG. 3A shows an example of a mobile device touch sensitive display screen 300 with a graphic 310 which represents a strike zone 305 defined by the top 301 of the simulated strike zone; the lower extent 302 of the strike zone; the simulated home plate 303. In FIG. 3B, as the user 201 swipes a finger 320 across the touch sensitive display screen 300, the internal time of the clock module 140 at which the swipe crossed the simulated plate is recorded along with the position of the swipe relative to 301 and 302. Note that in this example, the path of the baseball is not shown on display screen 300, and the user is either watching the pitch at a live game or on display monitor 203 showing a game. The vertical motion and position of the mobile device can also be recoded as the user 201 holds the device 300 in the other hand and rotates or tilts the device about the horizontal axis, towards or away from the user as the live pitch is perceived by the user to be inside or outside. If as in FIG. 3B, the user input position and timing data match the field measured data represented graphic 310 within a specified range of the field measured position and timing of the ball 310 over the plate, compensating for any broadcast latency, then the comparison can result in a simulated hit. If as in FIG. 3C the data do not match within a specified range, the comparison results in miss. The user swipe may have been early, late, high, low, inside or outside. The specified match criteria parameters can be conFIG.d based on the players selected level of difficulty or historically recorded performance level. A hit may also be refined as a foul ball or to left or right field based respectively on an early or late swipe. A pop fly or grounder may be indicated depending on respective high or low simulated hit, with distance determined by swipe speed. As previously discussed, in an alternative embodiment, the user inputs might come from swinging a mobile phone device other instrumented sporting device.

Figure 4:
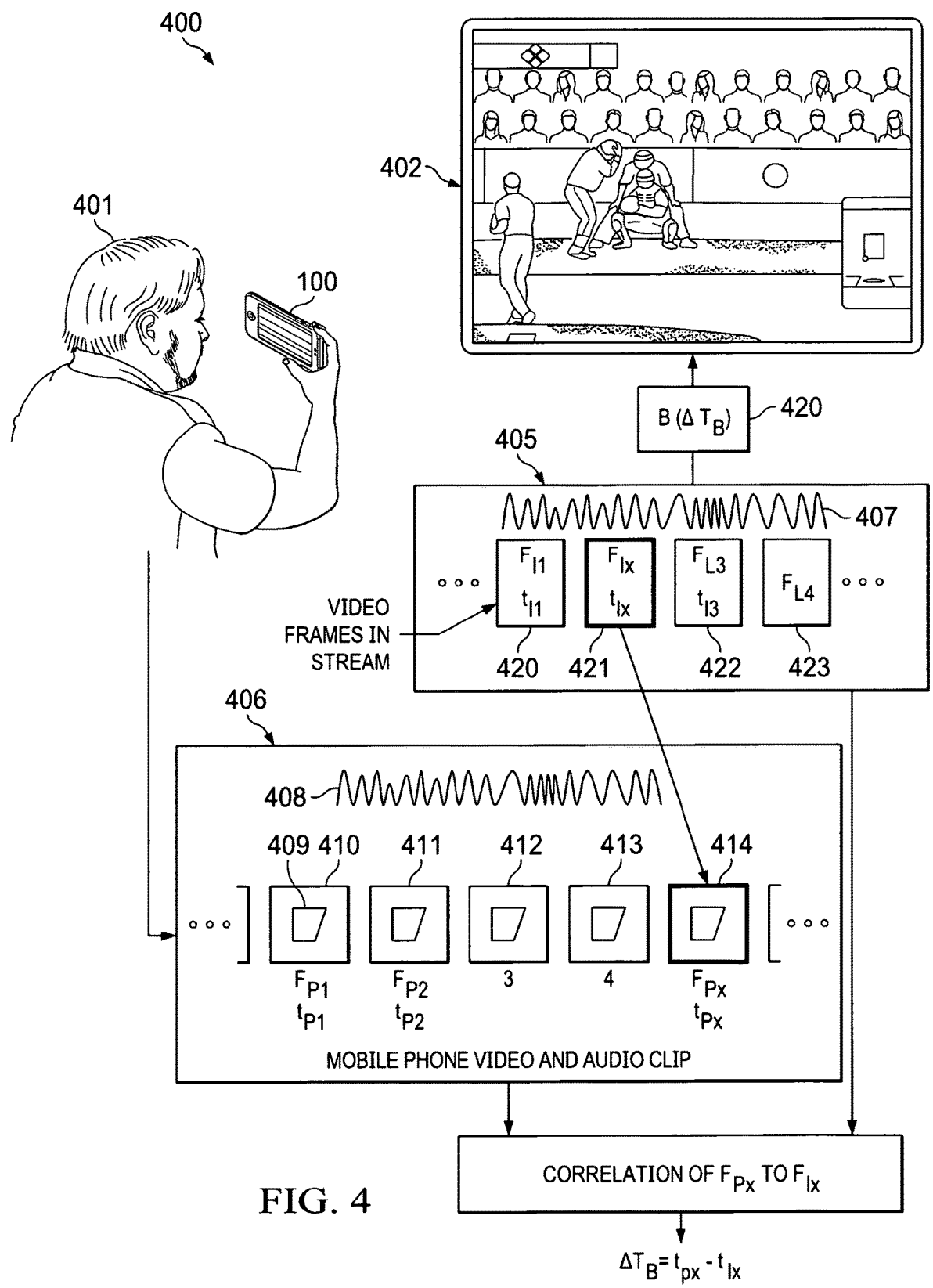
FIG. 4 is an overview illustration of one embodiment of the process of measuring the broadcast delay time differential.

Referring to FIG. 4, an example embodiment of the method of correlating field time to the internal time of the system 100 with real-time clock 140 is illustrated. User 401 uses the audio and video camera signal with module 180 that is integrated in system 100 to capture a segment of video and audio stream illustrated by 406 of the TV or monitor display 402 which is showing the live-latent event of interest. The bordering extents of monitor display 402 are projected as extents 409 in the recorded stream 406 which includes the audio portion 408 registered to frames 410, 411, 412, 413, 414. The broadcast stream 405 of the live event is transmitted through a broadcast system and presented in display 402. The broadcast transmission system 420 may introduce a delay which is indicated as $\Delta T_b$. Various methods of correlating images and audio are known to those skilled in the art of signal and image processing. By comparing the video frames and audio signal of stream 406 to that of the stored broadcast stream 405, a best alignment can be found, which is illustrated by Frame 421 at live field time $t_{lx}$ corresponding to Frame 414 at system time $t_{px}$. The latency $\Delta T_b$ which also includes any offset of time settings between the field clock and the system internal clock is then given as $\Delta T_b = t_{px} - t_{lx}$ and is used to register an event time on the field to a corresponding user input action.

Other embodiments of correlating field time to internal time could include frame flicker sensing to detect the monitor screen, filtering the detected monitor screen pixels for motion using frame differential, and temporal correlation of features associated with the moving object pixels with the field measurements of the live action moving object. It should also be noted where the audio volume of the live stream broadcast is sufficient, various methods exist to compare the recording device audio stream to that of the broadcast audio stream to correlate the two points in time and determine $\Delta T_b$ (see U.S. Pat. No. 6,990,453B2 for example).

Figure 5:
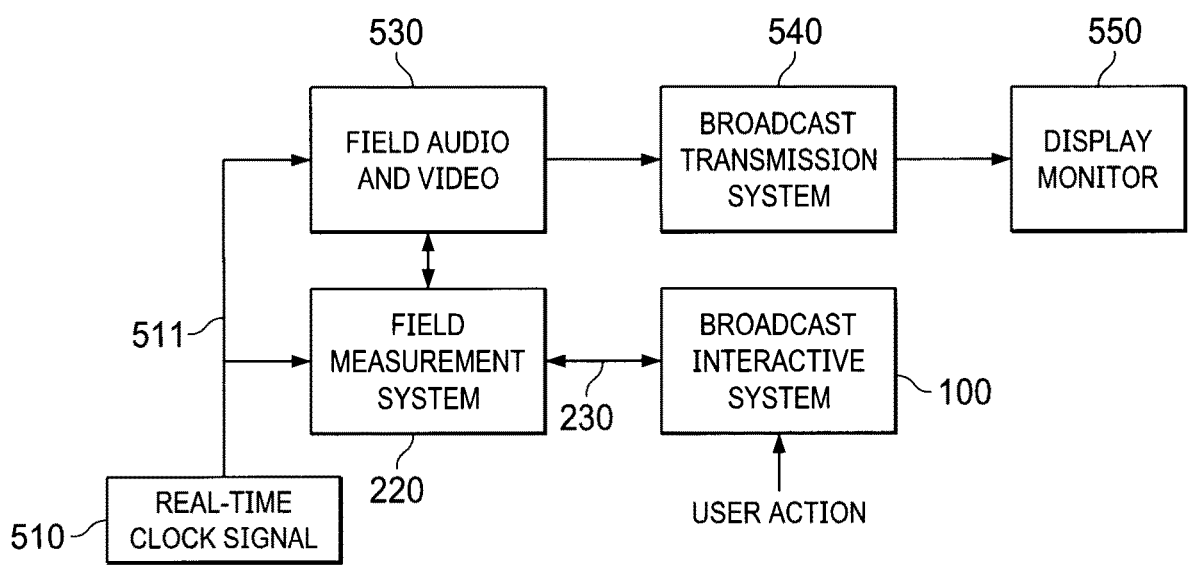
FIG. 5 is an overview block diagram of one embodiment of the invention

Referring now to FIG. 5, an example block diagram illustrating the major components of the synchronized interactive system are given. A high resolution real-time clock signal is generated from module 510 that is distributed with near zero delay to both the video recording system 530 and to the measurement system 220. This clocking signal is used to timestamp both data and ensures temporal alignment of the measurement of the event to the video display of the event.

The measurement system transmits the data over communication connection 230 (Wi-Fi or Bluetooth over internet for example) which is received by field data module 120 for analysis by the application module 110. In the example of baseball pitch tracking, the positions $(x,y,z,t)_1$, $(x,y,z,t)_2 \ldots (x,y,z,t)_{plate} \ldots (x,y,x,t)_n$ are measured by the tracking system 220 and transferred to the interactive system 100 hosting modules 120 and 110 where $(x,y,z,t)_{plate}$ are the coordinates at the time the ball crosses the center of the plate. Similarly, for the soccer example, the position and time data would be given for the soccer ball track, including the position and time at which the soccer ball crossed the plan of goal.

The broadcast transmission system 540 receives the video signal from cameras recording the live action and transmits this through one of several means to the display system 550 which is viewed by the user. For example, the live action video can be distributed to a television network for cable, satellite or air broadcast or streamed over the internet. System 540 as well as the display monitor 550 may introduce a time lag between the live action and visual representation on the display. This time lag may be very short or (seconds or milli-seconds) or hours or days in the case of a delayed broadcast or re-broadcast of the event.

The broadcast data may or may not contain the embedded time stamp data. This is not required since the interactive system only utilizes this information during the broadcast delay calibration process, thereafter the frame time being know assuming the broadcast delay is constant.

Figure 6:
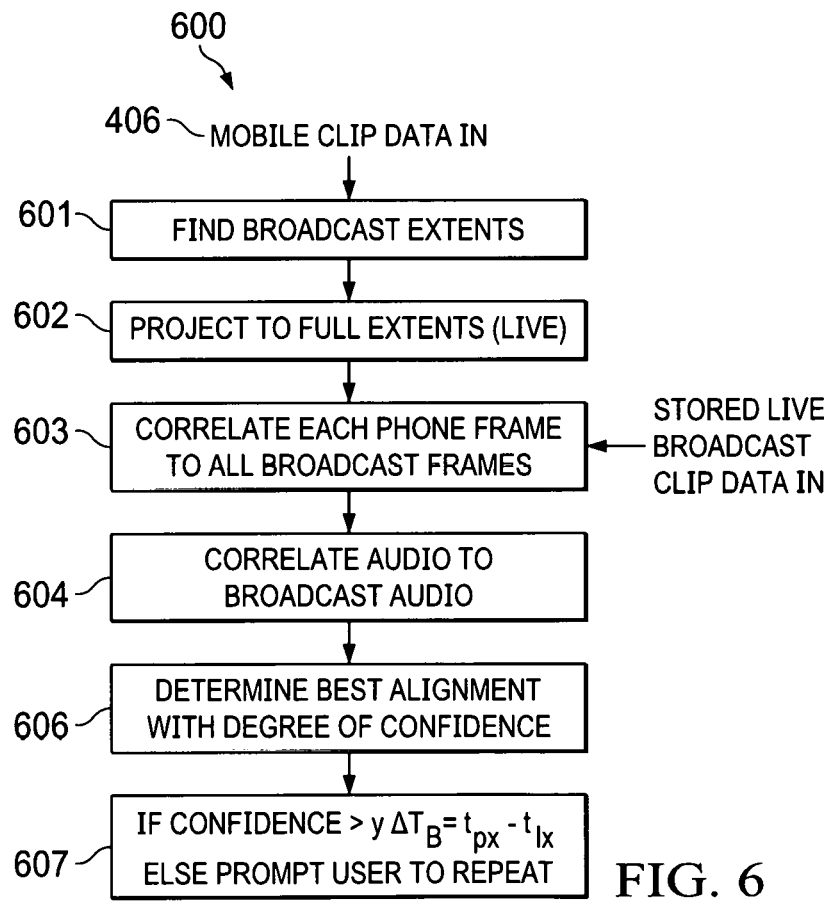
FIG. 6 is a diagram illustrating the major processing steps in one embodiment of the method of measuring the broadcast delay time differential.

Referring now to FIG. 6 an example of the steps that can be used to correlate the field time to the user input time using video frame correlation is illustrated in a block diagram sequence. The process begins with the set of stored video frames comprising a video clip captured by the user as for example 406. Using standard image processing edge detection and line intersection techniques in step 601, the extents of the broadcast monitor image (409) are found. Assuming the broadcast monitor is a rectangular presentation of the stream 405 with and approximately known aspect ratio, in step 602 the polygons 409 are geometrically projected back to the ratio as in 420, 421 etc. for each frame of 406. Next, in step 603 image correlation of each projected frame to each frame in the stored live sequence is performed. Each frame has then a maximum correlation position within the frame to frame comparison. Averaging these maximums as the projected stream sequence is compared with the broadcast sequence across the possible temporal alignments yields a a best alignment where the average maximum correlation is greatest. Next in step 604 which may be performed prior to step 603, audio stream alignment is performed by finding the audio stream 408 (if available with sufficient signal to noise ratio) within the broadcast audio stream 407 in a manner which is known in the art. The audio alignment found can then be used as a sole means of time calibration or used conjunction with step 606, using weighting parameters associated with the audio and video alignment to determine a best fit. Based on the alignment of 604 and 603, threshold parameters are used in step 607 to determine a confidence factor for the alignment and prompt the user to repeat the calibration process of 400 if high confidence in the temporal alignment is not attained.

Definitions

In this specification, the term "sporting session" refers to a sporting game or match such as a baseball game or soccer match or any other live action or animation with motion that can be viewed directly or displayed on a video device.

In this specification, the term "training session" refers to an acted-out scenario used for training purposes or any other action or animation with motion that can be viewed directly or displayed on a video device.

The term "broadcast event" refers to a portion of a sporting session, such as a baseball pitch or soccer shot on goal; or to a portion of a "training session" such as drawing a weapon or any other physical motion or simulated motion that can be used to elicit a reactionary response from a viewer.

In this specification, the term "latent timing event" refers to a broadcast event that is presented for viewing with a time lag relative to the time the event took place.

In this specification, the term "characteristics" of a latent timing even refers to measured properties of the event such as the time, position and velocity of a baseball pitch as it crosses or comes nearest the plate or other physical or temporal properties of the event.

In this specification, the term "user response" refers to a virtual action by a user, such as swiping a screen, tapping on a screen, or making an action with an instrumented sporting device such as an instrumented bat or other action motion or force by the user that can otherwise be characterized.

In this specification, the term "nature of a user response" refers to the predicted consequences of the virtual action by the user mapped to the sporting session or training session. Examples of the nature of a user response includes determining a simulated baseball swing position and timing relative to home plate and a pitched baseball; determining a simulated soccer keeper's position and timing relative to a soccer goal and a soccer shot on goal; determining the a simulated weapons draw or fire relative to the characteristics of events in a training session; or any other comparison and evaluation of a user action with regard to a broadcast event.

What is claimed is:

1. A game method comprising
providing a synchronized interactive system comprising
a video device,
a camera,
a user input device, and
a computing device configured to run an application program;
presenting a video broadcast of a sporting session on the video device;
recording a first video clip with the camera;
identifying a first broadcast event by
processing the first video clip with the application program;

creating, with the application program, a latent timing event for the broadcast event by determining the broadcast latency for the broadcast event;

determining, with the application program, characteristics of the latent timing event;

recognizing a user response, from the user input device, to the broadcast event displayed on the video device;

determining, with the application program, the time and nature of the user response to the broadcast event;

comparing, with the application program, the time and nature of the user response to the broadcast event to the characteristics of the latent timing event.

2. The game method of claim 1 wherein creating a latent timing event for the broadcast event by determining the broadcast latency for the broadcast event further comprises
determining the latency of the broadcast event; and
comparing a frame of the video broadcast to the internal time of a computer or processor.

3. The game method of claim 1 wherein the video device is a mobile phone video display.

4. The game method of claim 1 wherein
the video broadcast of a sporting event is a video broadcast of a baseball game on the video device;
identifying a first broadcast event further comprises recognizing a pitch;
recognizing a user response to the first broadcast event displayed on the video device further comprises recognizing a swipe on the user input device as a simulated swing at the pitch by the user;
determining the time and nature of a user's response to the broadcast event further comprises translating the swipe to a time, position, and velocity of the simulated swing; and
determining characteristics of the latent timing event further comprises determining the latent time and position of the of the pitch relative to home plate.

5. The game method of claim 4 wherein comparing the time and nature of the user's response to the characteristics of the latent timing event further comprises
determining whether the simulated swing would have hit the pitch.

6. The game method of claim 5 wherein comparing the time and nature of the user's response to the characteristics of the latent timing event further comprises
if the simulated swing would have hit the pitch, then determining the path of a simulated hit.

7. The method of claim 4 further comprising
comparing a plurality of user responses to a plurality of broadcast event characteristics.

8. The method of claim 7 further comprising
comparing the first user's responses to broadcast event characteristics to a second user's responses to the plurality of broadcast event characteristics.

9. The game method of claim 5 wherein determining whether the simulated swing would have hit the pitch further comprises
providing at least one tolerance parameter for the user; and
using at least one tolerance parameter to determine whether the simulated swing would have hit the pitch.

10. The game method of claim 9 wherein determining whether the simulated swing would have hit the pitch further comprises
calculating the at least one tolerance parameter through a handicapping method based on past performance by the user.

11. The game method of claim 1 wherein
the video broadcast of a sporting event is a video broadcast of a soccer game on the video device;
identifying a first broadcast event further comprises recognizing a shot on a soccer goal;
recognizing a user response to the first broadcast event displayed on the video device further comprises recognizing a tap on the screen of the mobile device as a simulated attempt to block the shot on the soccer goal by the user;
determining the time and nature of a user's response to the broadcast event further comprises translating the tap on screen to a time, and position relative to the soccer goal of the simulated attempt to block the shot on the soccer goal; and
determining characteristics of the latent timing event further comprises determining the latent time and position of the shot on goal relative to the soccer goal.

12. The game method of claim 11 further comprising
determining whether the time and position of the simulated attempt to block the shot on the soccer goal by the user would block the actual shot.

13. A training method comprising
providing a synchronized interactive system comprising
a video device,
a camera,
a user input device, and
a computing device configured to run an application program;
presenting a video broadcast of a training session on the video device;
recording a first video clip with the camera;
identifying a first broadcast event by
processing the first video clip with the application program;
creating, with the application program, a latent timing event for the broadcast event by determining the broadcast latency for the broadcast event;
determining, with the application program, characteristics of the latent timing event;
recognizing a user response, from the user input device, to the first broadcast event displayed on the video device;
determining, with the application program, the time and nature of the user response to the broadcast event;
comparing, with the application program, the time and nature of the user response to the broadcast event to the characteristics of the latent timing event.

14. The training method of claim 13 wherein the training session is a set of acted out or animated situations portraying various threat scenarios.

15. The training method of claim 14 wherein the user response is a simulated or weapons draw or fire in response the perceived threat.

* * * * *